United States Patent [19]
Shiono et al.

[11] Patent Number: 5,138,495
[45] Date of Patent: Aug. 11, 1992

[54] DIFFRACTIVE OPTICAL LENS

[75] Inventors: Teruhiro Shiono, Osaka; Hisahito Ogawa, Nara, both of Japan

[73] Assignee: Matsushita Electric Industrial Co., Ltd., Osaka, Japan

[21] Appl. No.: 731,850

[22] Filed: Jul. 17, 1991

[30] Foreign Application Priority Data

| Jul. 27, 1990 | [JP] | Japan | 2-199421 |
| Jul. 27, 1990 | [JP] | Japan | 2-199425 |
| Nov. 29, 1990 | [JP] | Japan | 2-335087 |

[51] Int. Cl.$^5$ .................................. G02B 3/08
[52] U.S. Cl. .................. 359/142; 369/44.23; 250/201.6
[58] Field of Search .............. 359/741, 742; 369/44.23; 250/201.6

[56] References Cited

U.S. PATENT DOCUMENTS

| 4,787,722 | 11/1988 | Claytor | 359/742 |
| 4,870,632 | 9/1989 | Shiono et al. | 369/44.23 |
| 4,904,069 | 2/1990 | Nakata | 359/742 |

FOREIGN PATENT DOCUMENTS

| 2920630 | 12/1979 | Fed. Rep. of Germany . |
| 3827834 | 2/1990 | Fed. Rep. of Germany . |
| 2021807 | 12/1979 | United Kingdom . |

OTHER PUBLICATIONS

T. Fujita, H. Nishihara, and J. Koyama, "Blazed Gratings and Fresnel Lenses Fabricated by Electron-Beam Lithography", vol. 7, No. 12, *Optics Letters* Dec. 1982, pp. 578-580.

Teruhiro Shiono, Masatoshi Kitagawa, Kentaro Setsune, and Tsuneo Mitsuyu, "Reflection Micro-Fresnel Lenses and Their Use in an Integrated Focus Sensor", vol. 28, No. 15, *Applied Optics*, Aug. 1989, pp. 3434-3442.

*Primary Examiner*—Loha Ben
*Attorney, Agent, or Firm*—Panitch, Schwarze, Jacobs & Nadel

[57] ABSTRACT

A diffractive optical lens of the present invention comprises a grating zone having a plurality of elliptical grooves which are similar in shape to each other so that each major axis is coincided. When light is obliquely incident, it is diffracted by the grating zone and is focused with any astigmatism thereof corrected. The center of each elliptical groove is shifted in one direction of the major axis direction, so that the light which is diffracted is focused with the coma corrected. As a result, even when light is obliquely incident, satisfactory focal characteristics can be obtained without aberrations.

10 Claims, 14 Drawing Sheets

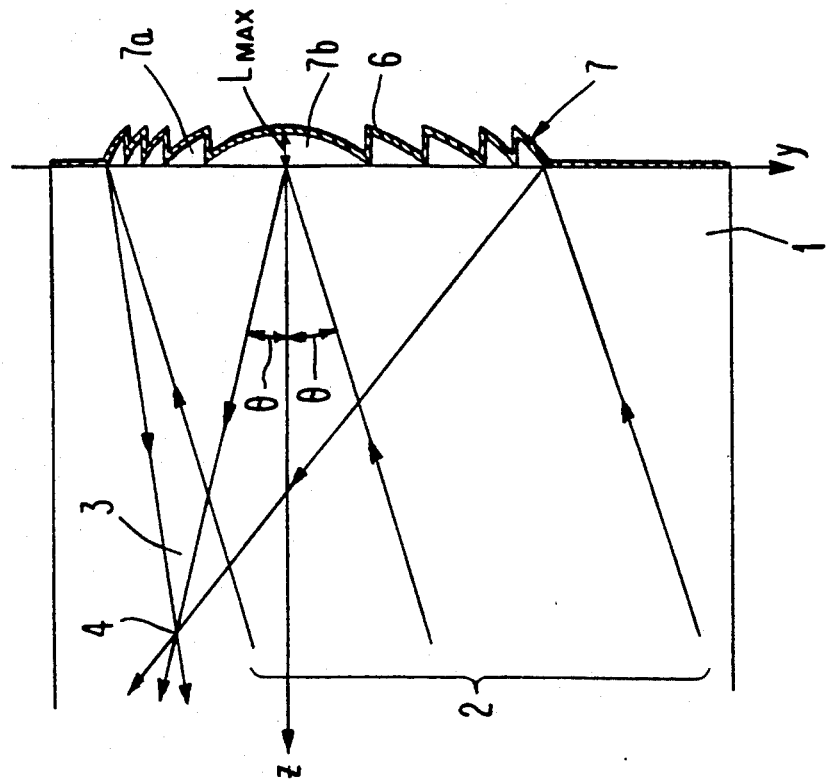
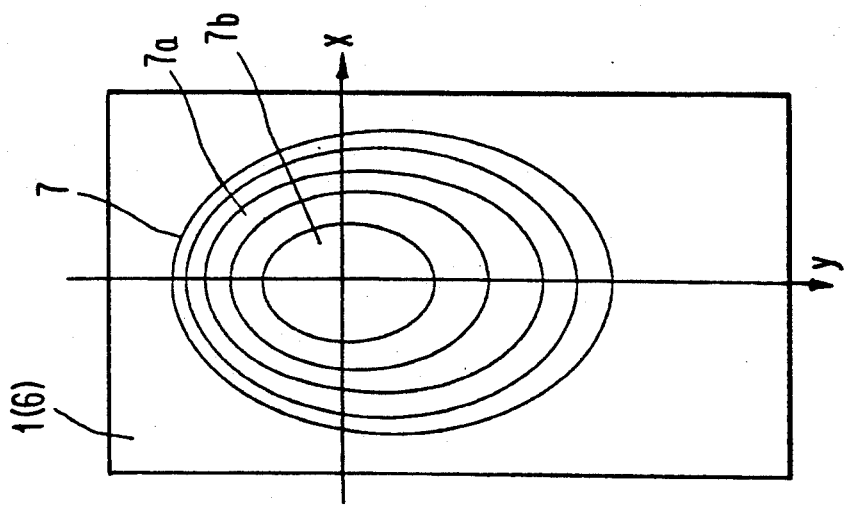

$\theta$-45°   $\Lambda/\lambda$=5

DIFFRACTIVE OPTICAL LENS

BACKGROUND OF THE INVENTION

1. Field of the Invention

The present invention relates to a diffractive optical lens, and more particularly to a reflection and transmission diffractive optical lens having excellent focusing characteristics without aberrations when light is obliquely incident thereupon.

2. Description of the Prior Art

Since a diffractive optical lens exhibits excellent focusing characteristics with a thickness of a few μm at most because of its grating construction, this type of lens has attracted attention as a miniaturized and lightweight lens.

Conventional reflection diffractive optical lenses are shown in FIGS. 1a and 1b. See T. Shiono, M. Kitagawa, K. Setsune and T. Mitsuyu: "Reflection micro-Fresnel lenses and their use in an integrated focus sensor", Appl. Opt., Vol. 28, No. 15, pp. 3434–3442 (1989).

This reflection diffractive optical lens has a transparent substrate 31 and a lens portion 38 provided on the substrate 31. The lens portion 38 has a grating zone 38a at its outer peripheral portion where a plurality of concentric circular grooves are provided and a core section 38b positioned at the center of its inner peripheral portion. The entire surface of the lens portion 38 is covered with a reflection layer 36. The grating zone 38a has a saw-tooth-shaped profile, and the distance between the grooves (grating period) becomes smaller toward the outer peripheral portion.

Conventional transmission diffractive optical lenses are shown in FIGS. 2a and 2b. See T. Fujita, H. Nishihara and J. Koyama: "Blazed gratings and Fresnel lenses fabricated by electron-beam lithography", Opt. Lett., Vol. 7, No. 12, pp. 578–580 (1982).

This transmission diffractive optical lens has a flat transparent substrate 41 and a lens portion 49 provided on the substrate 41. The lens portion 49 has a grating zone 49a where a plurality of concentric circular grooves are provided and a core section 49b in the same way as in the above-mentioned reflection diffractive optical lens. The grating zone 49a has a saw-tooth-shaped profile, and the distance between the grooves becomes smaller toward the outer peripheral portion.

In the above conventional reflection and transmission diffractive optical lenses, when light is vertically incident upon the surfaces of the substrates 31 and 41 on which the lens portions 38 and 49 are provided, the light is diffracted by the lens portions 38 and 49, whereby the light is satisfactorily focused. However, in the case of incident light 32 which is obliquely incident upon the surfaces of the substrates 31 and 41, aberrations are caused in reflected light 39 and transmitted light 47, thereby causing an out-of focus (obscure focal points 30 and 48). Thus, excellent focusing characteristics cannot be achieved.

SUMMARY OF THE INVENTION

The diffractive optical lens of this invention, which overcomes the above-discussed and numerous other disadvantages and deficiencies of the prior art, comprises:

a transparent substrate upon which light is incident; and a lens portion including a grating zone at an outer peripheral portion thereof, the grating zone having a plurality of elliptical grooves which are similar in shape to each other with their major axes being aligned, the lens portion being provided on a surface of the transparent substrate so as to allow the light incident upon the transparent substrate to be incident upon the lens portion;

wherein the centers of the elliptical grooves are shifted in one direction of the major axis with respect to the elliptical groove positioned in an inner peripheral portion.

In a preferred embodiment, the incident light is incident upon the transparent substrate at an angle $\theta$ with respect to the major axis direction in which the centers of the elliptical grooves are shifted.

In a preferred embodiment, a ratio of a length of each elliptical groove in the major axis direction to a length of each elliptical groove in the direction/a length in the minor axis direction) is $1/\cos\theta$.

In a preferred embodiment, either a maximum depth of each elliptical groove or a maximum thickness of the elliptical groove is varied in accordance with at least either the grating period of each elliptical groove or a peripheral direction of each elliptical groove.

In a preferred embodiment, either the maximum depth of each elliptical groove or the maximum thickness of the elliptical groove is locally maximized in the major axis direction of each elliptical groove and is locally minimized in the minor axis direction of each elliptical groove.

In a preferred embodiment, a local maximum value in the direction in which the center of the elliptical groove positioned at the outer peripheral portion is shifted is larger than the local maximum value in the opposite direction.

In a preferred embodiment, a cross section of the grating zone is in a sawtooth shape, either the maximum depth of each elliptical groove in the major axis direction or the maximum thickness of the elliptical groove in the major axis direction is given as L long=$\lambda/(2n\cdot\cos\theta)$ with respect to an index of refraction of the grating zone (n), a wavelength of the incident light ($\lambda$), and an angle of incidence ($\theta$), and either the maximum depth of each elliptical groove in the minor axis direction or the maximum thickness of the elliptical groove in the minor axis direction is given as L short=$\lambda/(2n)$.

In a preferred embodiment, the lens portion is covered with a reflection layer.

In a preferred embodiment, the thickness of the reflection layer is larger than the maximum thickness of the grating zone.

In a preferred embodiment, the reflection layer is covered with a protective layer.

Thus, the invention described herein makes possible the objective of providing a diffractive optical lens having excellent focusing characteristics without aberrations when light is obliquely incident thereupon.

BRIEF DESCRIPTION OF THE DRAWINGS

This invention may be better understood and its numerous objects and advantages will become apparent to those skilled in the art by reference to the accompanying drawings as follows:

FIG. 3a is a plan view showing a first example of a diffractive optical lens of the present invention, and FIG. 3b is a cross-sectional view thereof;

DESCRIPTION OF THE PREFERRED EMBODIMENTS

EXAMPLE 1

Figure 1B:
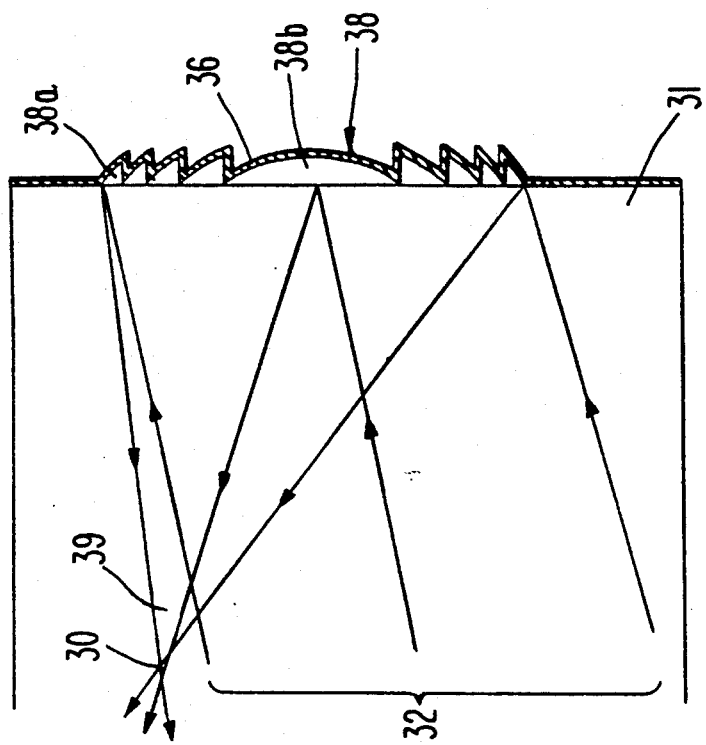
FIG. 1b is a cross-sectional view thereof.
Figure 1A:
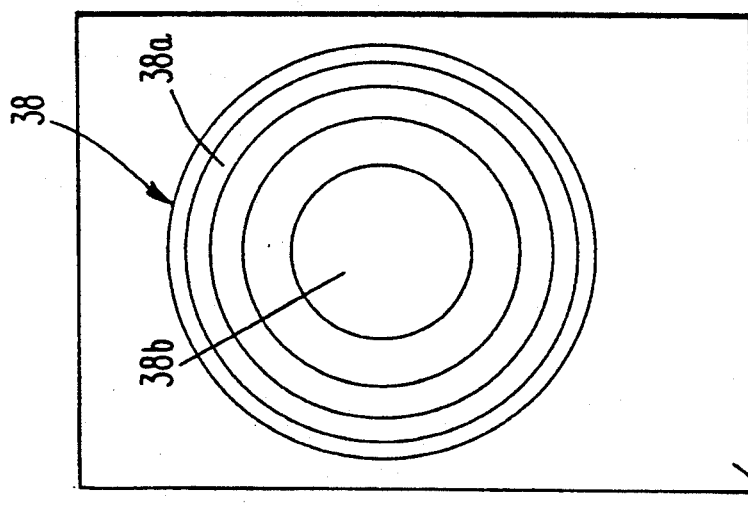
FIG. 1a is a plan view showing a conventional reflection diffractive optical lens.
Figure 2B:
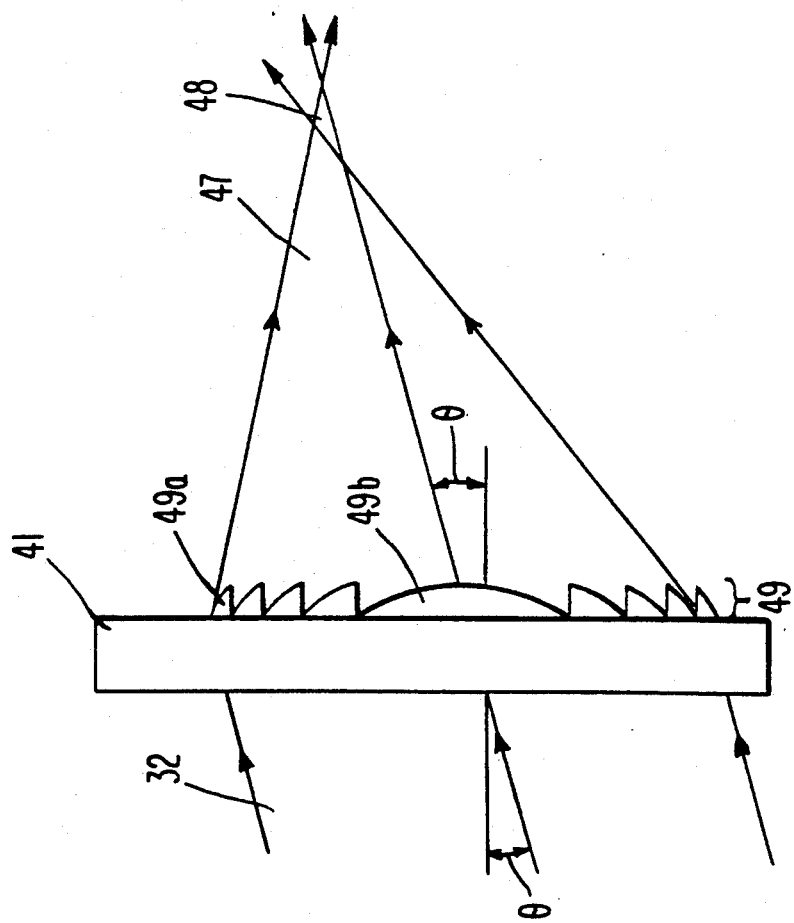
FIG. 2b is a cross-sectional view thereof.
Figure 2A:
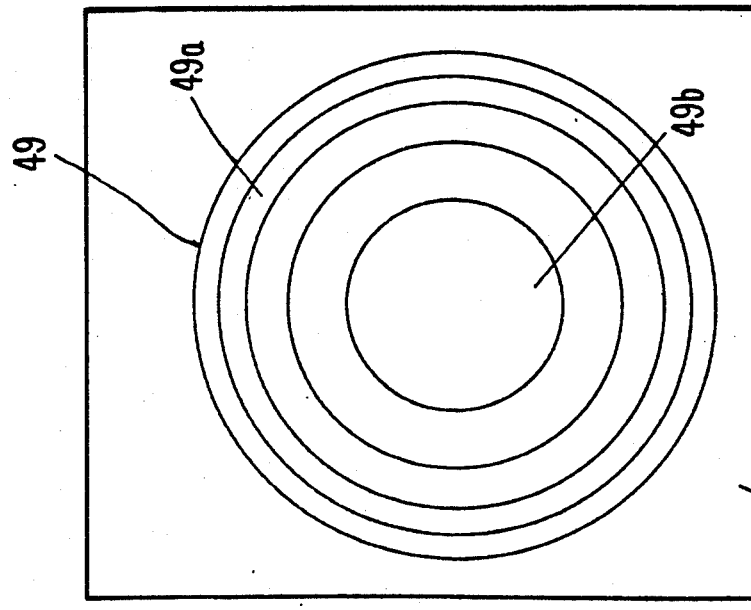
FIG. 2a is a plan view showing a conventional transmission diffractive optical lens.

In FIGS. 3a and 3b, a reflection diffractive optical lens has a transparent substrate 1 made of glass or the like, upon which light is incident, a lens portion 7 provided on a surface of the substrate 1 so that the light which is incident upon the substrate 1 will be incident inside the lens portion 7, and a reflection layer 6 covering a surface of the lens portion 7. The reflection layer 6 is formed from a layer made of metal such as Ag, Al, and Au or a multi-layer film of a dielectric substance.

The lens portion 7 comprises a grating zone a at an outer peripheral portion thereof where a plurality of elliptical grooves are provided, and a core section 7b at a center thereof so as to be surrounded by the grating zone 7a. The plurality of elliptical grooves have different sizes with an identical major axis in common and are similar in shape to each other. In this example, a cross-section of the grating zone 7a is adapted to form a sawtooth shape.

In order to describe the lens portion 7 in more detail, the surface of the substrate 1 on which the lens portion 7 is provided is made an x-y plane, and a z-axis is orthogonal to the x-y plane. Light is incident from the z-axis direction. The major axis of each elliptical groove at the grating zone 7a is positioned on a y-axis. Minor axis of the elliptical groove disposed on the innermost side is positioned on an x-axis. The ratio of the major axis to the minor axis of each elliptical groove is identical, and these elliptical grooves are similar in shape with different sizes. Moreover, each elliptical groove is not concentric. The center point of each elliptical groove is shifted in one direction of the major axis (+y-axis direction). A distance between the elliptical grooves adjacent to each other (grating period) becomes smaller toward the outer peripheral portion.

In this example, the depth of each elliptical groove is identical, so the maximum thickness of the elliptical groove is constant. The maximum thickness of the elliptical groove is equal to a maximum thickness $L_{max}$ of the core section 7b.

Light is incident upon the lens portion 7 with a tilt angle $\theta$ in the y-z plane with respect to the z-axis. The incident light is diffracted by the grating zone 7a and the core section 7b of the lens portion 7, and then is reflected from the reflection layer 6. The reflected light 3 has an optical axis with an angle $\theta$ in the -y-axis direction with respect to the z-axis and is focused at a focal point 4 in the substrate 1. The diffractive optical lens of this example is an inline type lens in which angles of incidence and a diffraction are identical.

As described above, a grating pattern of the grating zone 7a of the lens portion 7 is formed from a plurality of elliptical grooves which are similar in shape to each other, thereby preventing an astigmatism when incident light 2 is obliquely incident upon the lens portion 7. An astigmatism is caused when the grating pattern is formed from circular grooves. Moreover, a center of each elliptical groove forming the grating pattern is shifted in the direction (the major axis direction) to which the incident light 2 is tilted, thereby satisfactorily focusing the light without causing a coma.

Assuming that a focal length of the lens portion 7 is f, a wavelength of the incident light 2 is $\lambda$, and an index of refraction of the substrate 1 is n', a phase shift function $\Phi$ for forming a lens in a coordinate system of FIG. 3 is given by:

$$\Phi(x, y) = n'k[\sqrt{x^2 + (f\cdot \sin\theta + y)^2 + f^2\cos^2\theta} - f - y\cdot \sin\theta] - 2m\pi$$

where $k=2\pi/\lambda$, and m is an integer satisfying $0\leq \Phi \leq 2\pi$. This $\Phi$ corresponds to the distribution L of the thickness of the lens portion 7 with respect to the maximum thickness of the elliptical groove or the maximum depth $L_{max}$ of the elliptical groove in the lens portion 7. The following equation is satisfied:

$$L(x, y) = L_{max}(1 - \Phi/2\pi)$$

According to the above, each elliptical groove (a portion where the thickness of the lens portion 7 becomes 0) has a center (0, $m\lambda \cdot \tan\theta/n'\cos\theta$), a length of $2/\cos\theta \cdot \sqrt{m^2\lambda^2 n'^2\cos^2\theta + 2m\lambda f/n'}$ in the major axis direction, and a length of $2\sqrt{m^2\lambda^2/n'^2\cos^2\theta + 2m\lambda f/n'}$ in the minor axis direction. As a result, the ratio of the major axis to the minor axis (major axis/minor axis) of each elliptical groove is $1/\cos\theta$. A configuration of each elliptical groove is determined by an angle of incidence θ of light which is incident upon the lens portion 7. Accordingly, when the angle of incidence θ is increased, the ratio of the major axis to the minor axis of each elliptical groove in the grating zone 7a also increases, and a shift of the center of each elliptical groove becomes large. These results are confirmed by a theoretical analysis using a ray trace.

An example of a method for producing the above-mentioned diffractive optical lens will be described. The substrate 1 is coated with an electron beam resist which is a synthetic resin sensitive to an electron beam such as PMMA and CMS, and an electron beam is irradiated onto this substrate 1. The electron beam is irradiated onto the grating zone 7a of a diffractive optical lens to be produced and is scanned so that the electron beam be in the same elliptical shape as that of each elliptical groove. At this time, a linear velocity for scanning the electron beam is varied in accordance with a circumferential position in each elliptical groove. In this example, the electron beam is scanned at a lower speed in the vicinity of the major axis and at a higher speed in the vicinity of the minor axis. An exposure rate of the electron beam is adjusted so that the cross section of the electron beam resist be in a sawtooth shape. The substrate 1 is irradiated with an electron beam to form the elliptical grooves from inside to outside until the outermost groove is formed to a predetermined size. After that, a developing treatment is effected to form a grating zone. In this way, the lens portion 7 is formed to a predetermined thickness. Then, the reflection layer 6 made of Ag or the like is deposited on the surfaces of the lens portion 7 and the substrate 1 to a thickness of 4,000 Å, thereby producing a diffractive optical lens.

As mentioned above, the linear velocity for scanning the electron beam is varied when the electron beam is irradiated, whereby the thickness of the grating zone 7a in the major axis direction and that of the grating zone 7a in the minor axis direction can be approximately equal, and a diffractive optical lens as designed can be produced. The thickness of the reflection layer 6 is made larger than the maximum thickness of the grating zone 7a, thereby improving a reflection efficiency.

An example of the diffractive optical lens according to this example in which a wavelength λ=0.6328 μm and an angle of incidence θ=30° will be described. In this example, a center of each elliptical groove is shifted in one direction of the major axis so that a length of the lens portion 7 in the major axis direction is 1 mm, a length of the lens portion 7 in the minor axis direction is 0.87 mm, a focal length f is 7.5 mm (an index of refraction n' of the substrate 1 is 1.6 and a focus position is inside the substrate 1), the number of elliptical grooves in the grating zone 7a is 31, a maximum thickness of the elliptical groove in the grating zone 7a is 0.2 μm which is equal to the maximum thickness $L_{max}$ in the core section 7b, and a shift of the center in the major axis direction between the smallest elliptical groove (innermost side) and the largest elliptical groove (outermost side) is 8.2 μm. A length of the smallest elliptical groove in the major axis direction in the grating zone 7a is 74 μm, and an average grating period between the major axis end portions of the largest elliptical groove and the elliptical groove, which is adjacent to the largest elliptical groove and positioned on the inner peripheral side thereof, is 7.8 μm.

The diffractive optical lens of this example is not limited to the above construction and can be produced in any desired manner.

When the diffractive optical lens of this example is mass-produced, the lens portion 7 on which the reflection layer 6 is not deposited is produced, and then a metal mold is formed by the nickel electro-forming or the like, using this lens portion as an original disk. The lens portion 7 is successively duplicated from this metal mold by using a UV-setting resin or the like. The reflection layer 6 is deposited on each duplicated lens portion 7, thereby producing lenses having identical grating patterns at a lower cost. According to this method, the diffractive optical lenses can be arranged in an array, each lens portion having identical characteristics and satisfactory precision.

As to substrate 1, it is preferred that a transparent substrate allowing light having a working wavelength to pass therethrough be used. For example, a glass substrate made of quartz or the like is thermally stable and preferably used. Moreover, a substrate made of a synthetic resin is light-weight, and a diffractive optical lens produced by using this substrate can be light-weight.

When optical characteristics are examined by optical lens of this example, a converging spot in a satisfactory circular shape with little aberration can be observed on the focal surface, unlike the conventional diffractive optical lens.

Figure 4:
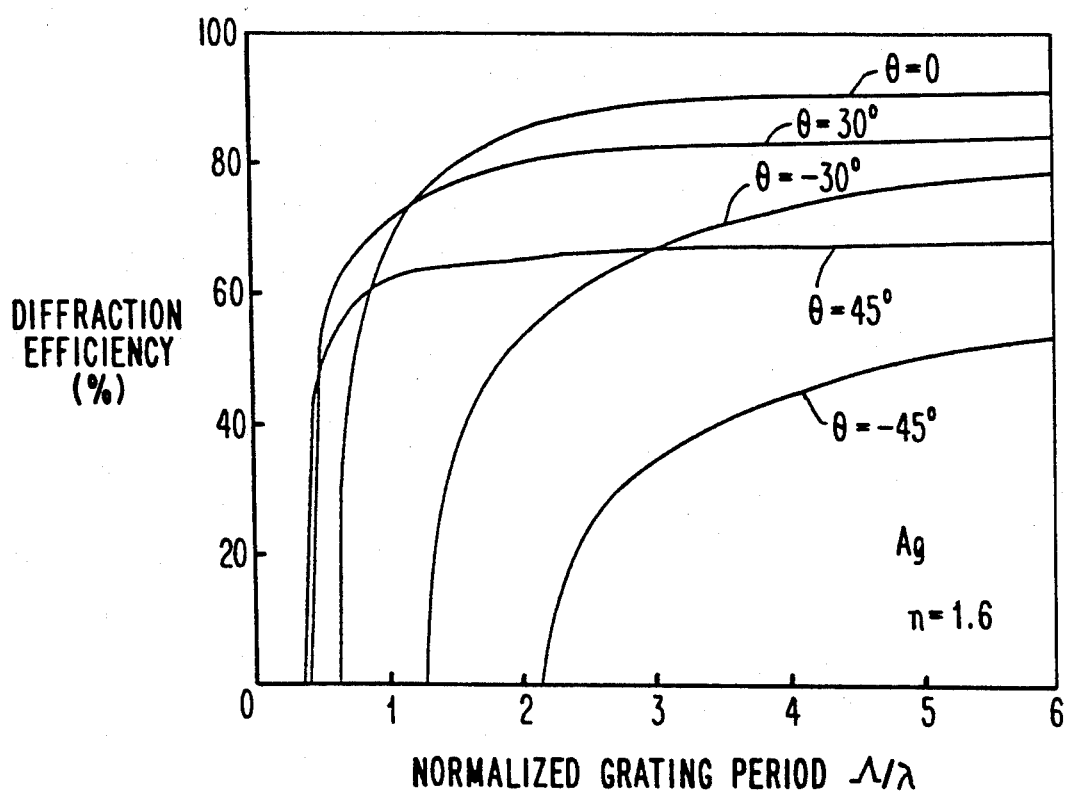
FIG. 4 is the calculated first-order diffraction efficiency curves of the first example of the diffractive optical lens of the present invention as a function of a normalized grating period $\Lambda/\lambda$ when $L_{max}=\lambda/2n$ is constant.
Figure 5:
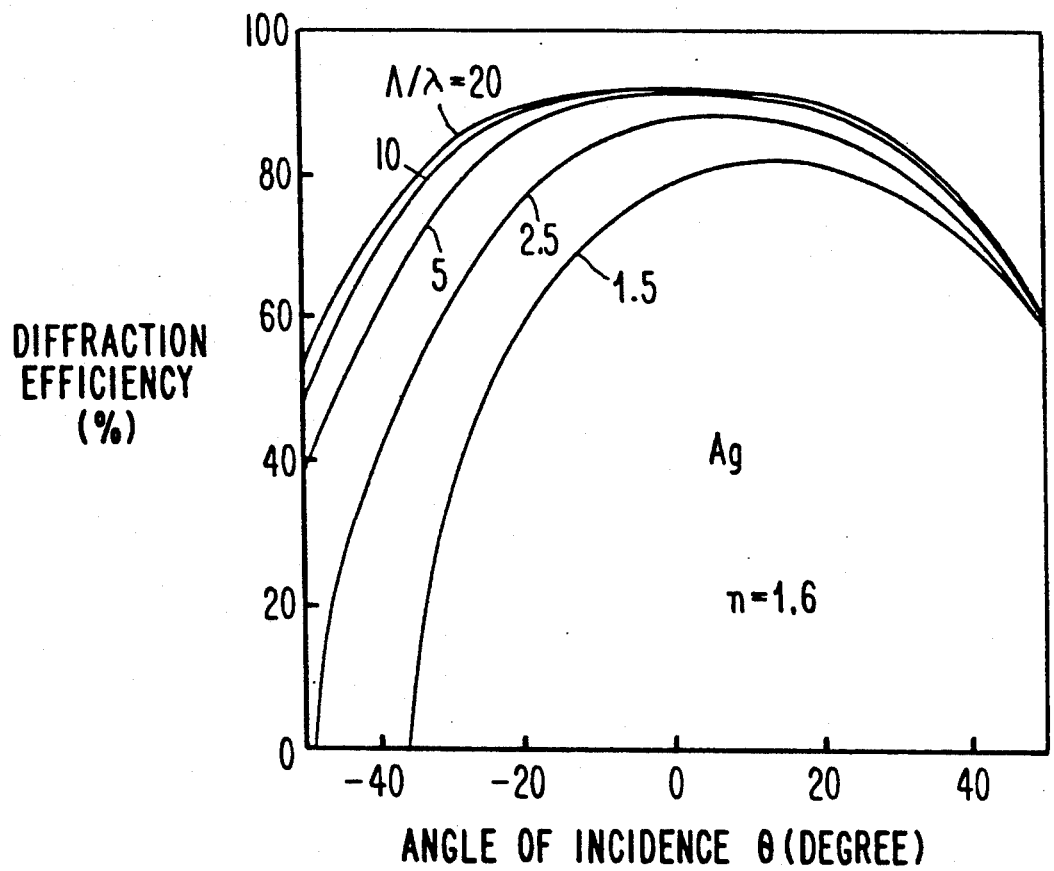
FIG. 5 is the calculated first-order diffraction efficiency curves of the first example of the diffractive optical lens of the present invention as a function of an angle of incidence $\theta$ when $L_{max}=\lambda/2n$ is constant.

Moreover, when a first-order diffraction efficiency of the diffractive optical lens of this example is measured, the results shown in FIGS. 4 and 5 are obtained. FIG. 4 is a graph showing the relationship between a first-order diffraction efficiency of the lens portion 7 of the diffractive optical lens of the present example in a region which is the vicinity of x=0 and where y≦0, and a normalized grating period Λ/λ having a wavelength of λ in this region. FIG. 5 is a graph showing the relationship between the first-order diffraction efficiency and an angle of incidence θ. In addition to the diffractive optical lenses of the above-mentioned type used for the measurement, the optical lens in which the reflection layer 6 is made of Ag and the maximum thickness $L_{max}$ of the lens portion 7 is λ/2n is used, where n is an index of refraction of a material forming the lens portion 7.

The measurement was performed by irradiating an He-Ne laser beam having a wavelength λ=0.6328 μm into the lens portion 7, centering on the region in the vicinity of x=0 and where y≦0 under the condition that the beam diameter is restricted. The power of the incident light and the power of the first-order diffracted light are measured to obtain the ratio thereof (first-order diffraction efficiency). The first-order diffraction efficiency with respect to various angles of incidence are obtained in the case of diffractive optical lenses with different grating periods.

As is apparent from FIGS. 4 and 5, the diffraction efficiency depends on the grating period Λ/λ and the angle of incidence θ. When θ is constant, the diffraction efficiency is likely to be larger with the increase of Λ/λ. The angle of incidence θ is positive when light is incident from the region of y>0 and is negative when light is incident from the region of y<0. When it is positive, the efficiency is better, and a high efficiency is obtained in spite of a small grating period. Moreover, when Λ/λ is constant, a maximum diffraction efficiency can be obtained in the vicinity of a Bragg angle (=sin$^{-1}$ (λ/2n'Λ)) and the diffraction efficiency is gradually decreased thereafter. For example, when the grating period is 10 times the wavelength (Λ/λ=10), the diffraction efficiency is 80% or more in the range of $=32°\leq\theta\leq35°$.

The diffraction efficiency in the region which is the vicinity of $x=0$ and where $y\leq0$ is obtained, thereby readily determining a diffraction efficiency in the other regions. That is, the diffraction efficiency with a particular angle of incidence in the region which is the vicinity of $x=0$ and where $y\leq0$ corresponds to the diffraction efficiency with an angle of incidence $\theta$ whose + or − mark is opposite from that of the particular angle of incidence, since the sawtooth-shaped cross section in the region which is the vicinity of $x=0$ and where $y\leq0$ and the saw-tooth-shaped cross section in the region which is the vicinity of $x=0$ and where $y\leq0$ are symmetrical. Assuming that an angle formed by a grating vector (size: $K=2\pi/\Lambda$, direction: a direction orthogonal to the grating zone 7a) of the grating zone 7a and the x-axis is $\theta_1$, the diffraction efficiency in an arbitrary region of the lens portion 7 corresponds to a diffraction efficiency obtained from a product of the angle of incidence $\theta$ and $\sin\theta_1$. The diffraction efficiency of the lens portion 7 partly becomes maximum in the vicinity of the minor axis and is decreased in the major axis direction. In FIGS. 4 and 5, the rate at which the diffraction efficiency varies is increased with the increase of the angle of incidence $\theta$.

In this example, the case in which parallel light is incident is described, and a spherical wave can be also focused in the same way. The diffractive optical lens of the present example can be used as a collimator lens which changes a spherical wave into parallel light.

Moreover, the diffractive optical lens of the present example is a reflection type, so that incident light which is substantially tilted can be satisfactorily focused with less decrease in the diffraction efficiency, compared with the transmission diffractive optical lens.

According to the diffractive optical lens of the present example, the aberration with respect to oblique incidence is minimized. The astigmatism and coma are caused with respect to vertical incidence. Therefore, in order to purposely cause the astigmatism and coma, the vertical incidence can be used.

EXAMPLE 2

Figure 6A:
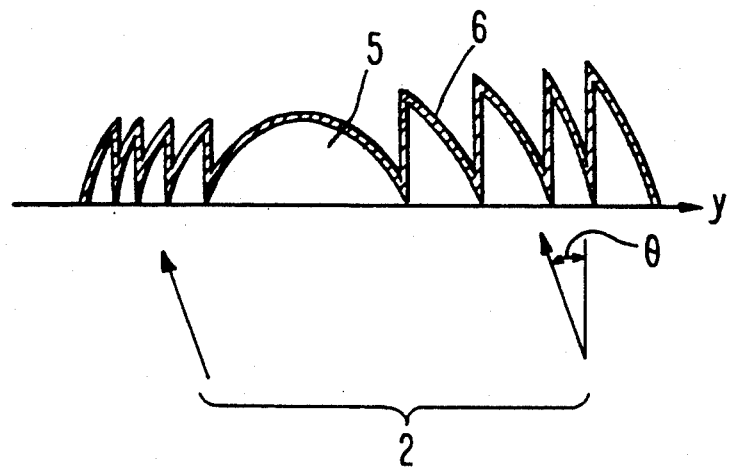
FIG. 6a is a cross-sectional view taken along a major axis of a second example of a diffractive optical lens of the present invention.
Figure 6B:
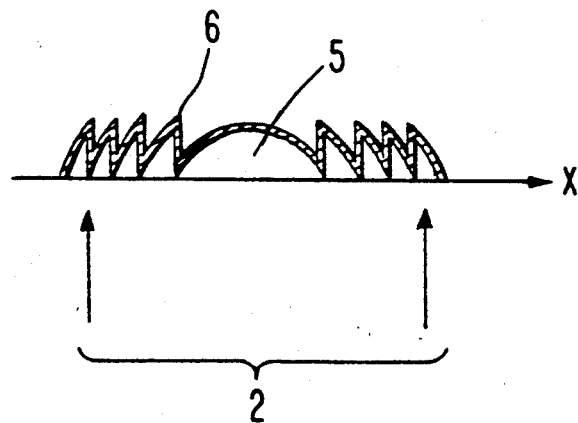
FIG. 6b is a cross-sectional view taken along a minor axis thereof.

FIGS. 6a and 6b are cross-sectional views taken along the major axis and the minor axis, showing fundamental constructions of a second example of a diffractive optical lens of the present invention, respectively. The diffractive optical lens of this example is also a reflection type, but is different from Example 1. In this example, a maximum thickness (a height of a sawtooth-shaped cross section) of the elliptical groove of the grating zone 7a or a maximum depth of each elliptical groove is not constant and is varied in the circumferential direction of the grating zone 7a in accordance with the period of the elliptical groove.

The maximum thickness of the elliptical groove of the grating zone 7a or the maximum depth of the elliptical groove is varied in the circumferential direction of the grating zone 7a in accordance with the period of the elliptical groove, thereby improving the diffraction efficiency. In particular, when the cross section of the grating zone 7a is in a sawtooth shape, the diffraction efficiency is substantially improved.

Figure 7A:
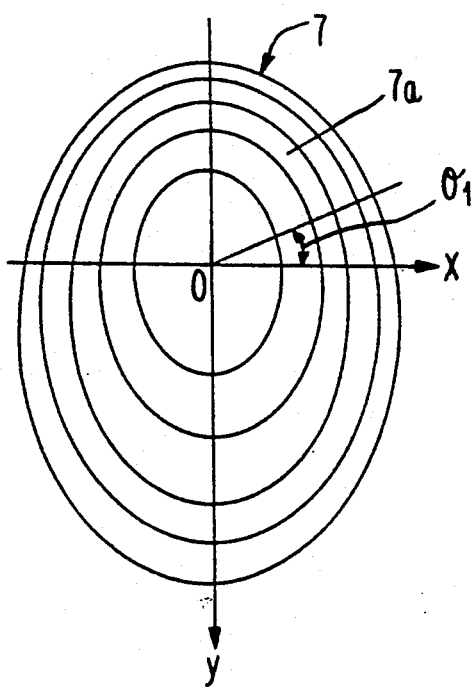
FIG. 7a is a plan view showing the second example of the diffractive optical lens of the present invention.
Figure 7B:
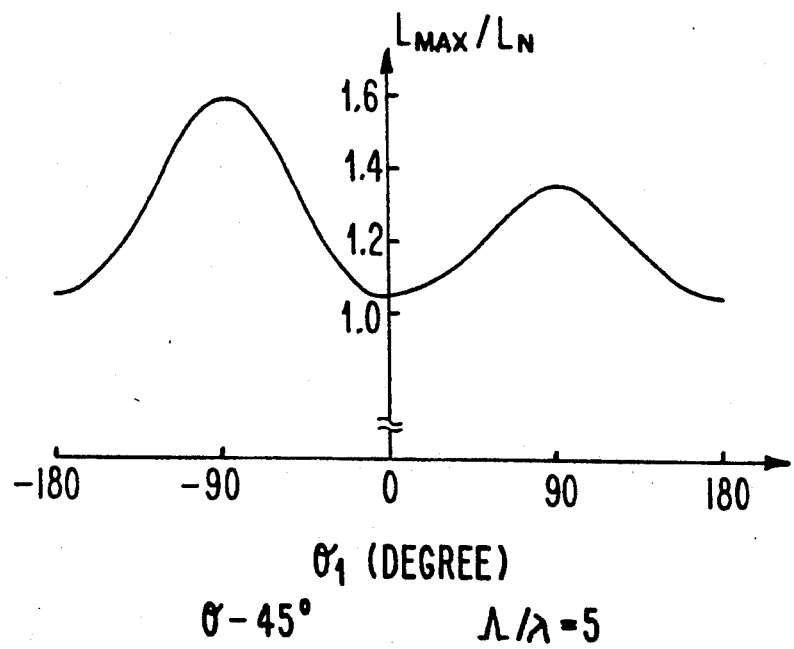
FIG. 7b is a graph showing a distribution of a maximum thickness of respective elliptical groove provided in a grating zone of the lens when $\theta=45°$ and $\Lambda/\lambda=5$.

FIG. 7a is a plan view showing the diffractive optical lens of this example, illustrating a distribution of the maximum thickness of the respective elliptical groove of the grating zone 7a, and FIG. 7b is a graph showing the relationship between an angle $\theta_1$ of a grating vector with respect to the x-axis and the maximum thickness of the normalized elliptical groove of the lens portion 7. As shown in FIGS. 7a and 7b, when the maximum thickness of the elliptical groove is successively varied toward the outer peripheral portion so that the thickness can reach the local maximum value at $\theta_1=\pm90°$ and the thickness can reach the local minimum value at $\theta_1=0$, $\pm180°$, the diffraction efficiency is improved. The maximum thickness of the elliptical groove is approximately constant in the region $(y<0)$ along the major axis direction. In the region $(y>0)$, the maximum thickness of the elliptical groove is made larger with the decrease in the grating period, and the maximum thickness of the elliptical groove is made approximately constant in the minor axis direction. The local maximum value $(\theta_1=-90°)$ in the $+y$ direction in which the center of the ellipse is shifted is made larger than the other local maximum value $(\theta_1=+90°)$. The local maximum value of the thickness of the elliptical groove is given by the ratio of the maximum thickness of the elliptical groove $L_{max}$ to $LN=\lambda/2n$. When $\theta_1$ is equal to $+90°$ and $\theta_1$ is equal to $-90°$, $L_{max}/LN$ is equal to 1.36 and $L_{max}/LN$ is equal to 1.6, respectively. The local minimum value is $L_{max}/LN=1.05$.

A diffractive optical lens of this example when the angle of incidence $\theta=45°$ and the wavelength of incident light $\lambda=0.6328$ μm will be described. In this example, a length in the major axis direction is 1 mm, a length in the minor axis direction is 0.71 mm, a focal length f is 3 mm (a glass substrate with an index of refraction $n'=1.6$), the number of the elliptical grooves in the grating zone 7a is 47, a radius of the smallest elliptical groove in the major axis direction is 56 μm, and the period of the elliptical groove is gradually varied so that an average period at each end portion in the major axis direction at the outermost peripheral portion is 4.5 μm. A shift of the centers of the elliptical groove at the outermost peripheral portion and the elliptical groove at the innermost peripheral portion is 26.3 μm. The maximum thickness of the elliptical groove shown in FIG. 7 depends on the type of the lens and the maximum thickness can be varied in accordance with the type of the lens. The state of variation of the elliptical grooves are the same even though the type of the lens is different.

Figure 8:
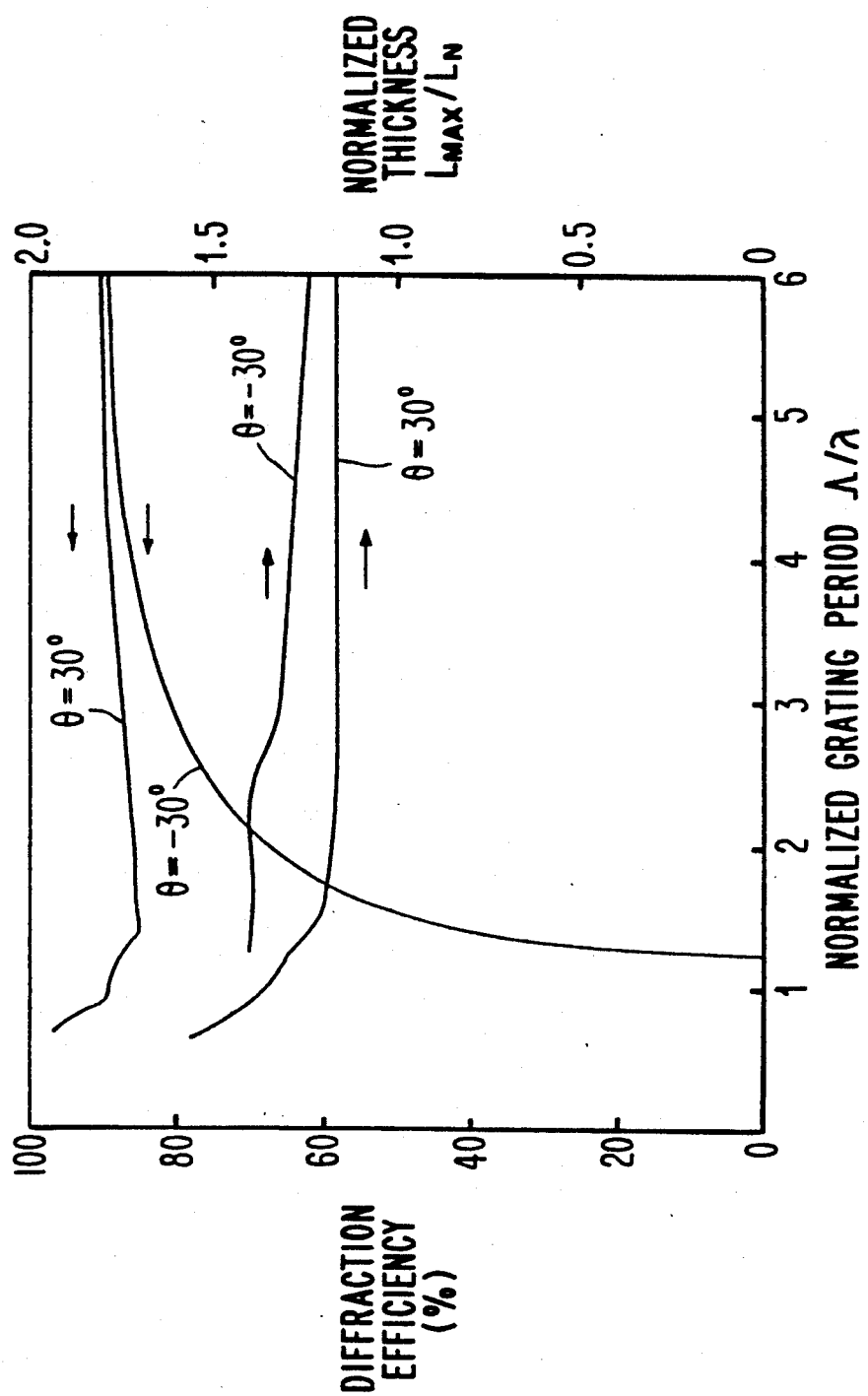
FIG. 8 is the calculated first-order diffraction efficiency and normalized optimum thickness curves of the second example of the diffractive optical lens of the present invention as a function of a normalized grating period $\Lambda/\lambda$.

FIG. 8 is a graph showing the relationship between an optimum value (a value in the region of the lens portion 7 which is the vicinity of $x=0$ and where $y\leq0$) of the maximum thickness of the elliptical groove of the diffractive optical lens of this example and a value of a first-order diffractive efficiency. In FIG. 8, the angle of incidence $\theta$ is $\pm30°$. As is apparent from the comparison with FIG. 4, the maximum thickness of the elliptical groove is optimized, thereby substantially improving the diffraction efficiency. Also, for example, when $\theta=30°$ $(>0)$, the optimum maximum thickness of the elliptical groove is constant even at a substantially small period such as $\Lambda/\lambda=2.5$. When $\theta$ is negative and the period is gradually decreased, the optimum maximum thickness of the elliptical groove is increased.

Figure 9:
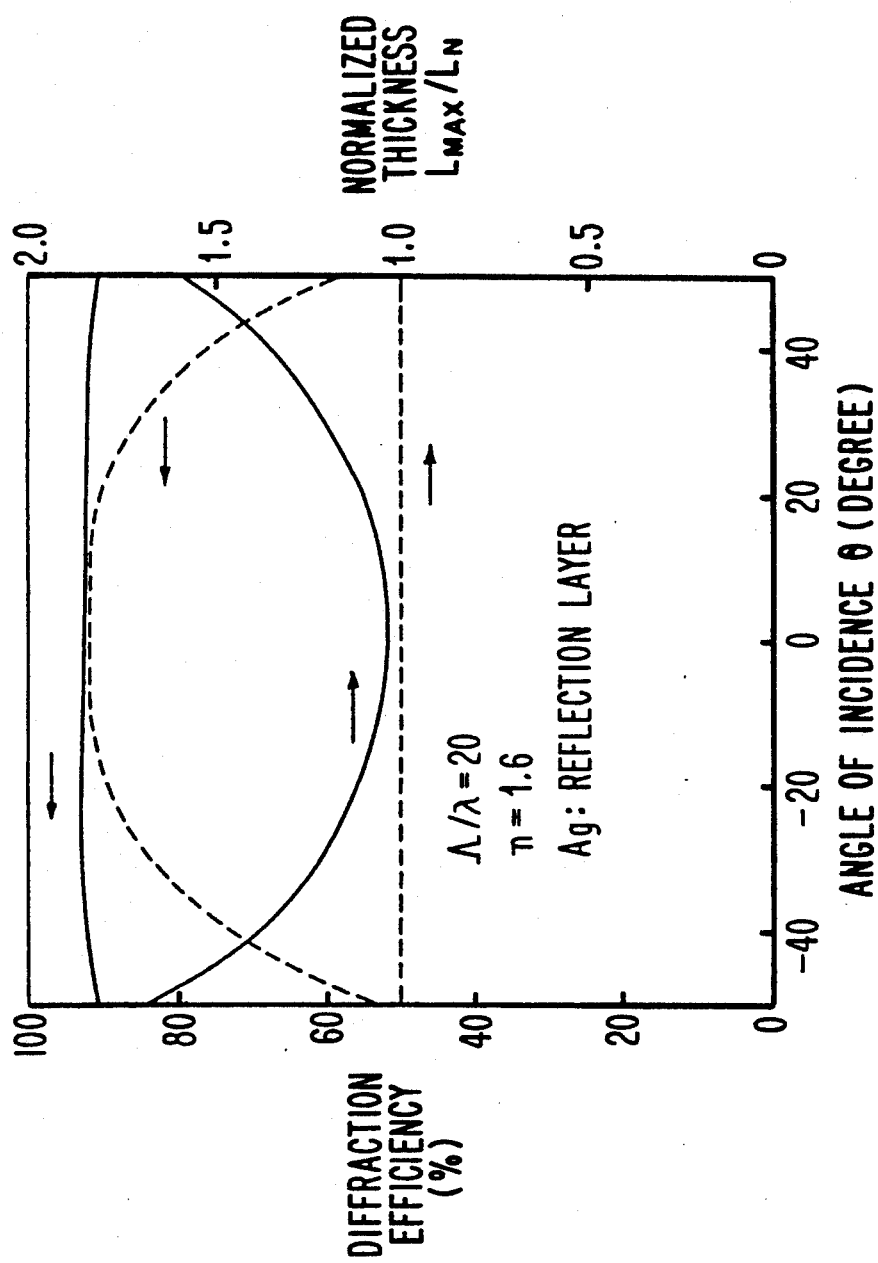
FIGS. 9, 10, and 11 are the calculated first-order diffraction efficiency and optimum thickness curves of the second examples of the diffractive optical lens for the reflection grating with Ag as a function of an angle of incidence $\theta$ when $\Lambda/\lambda$ is 20, 10, and 5.
Figure 10:
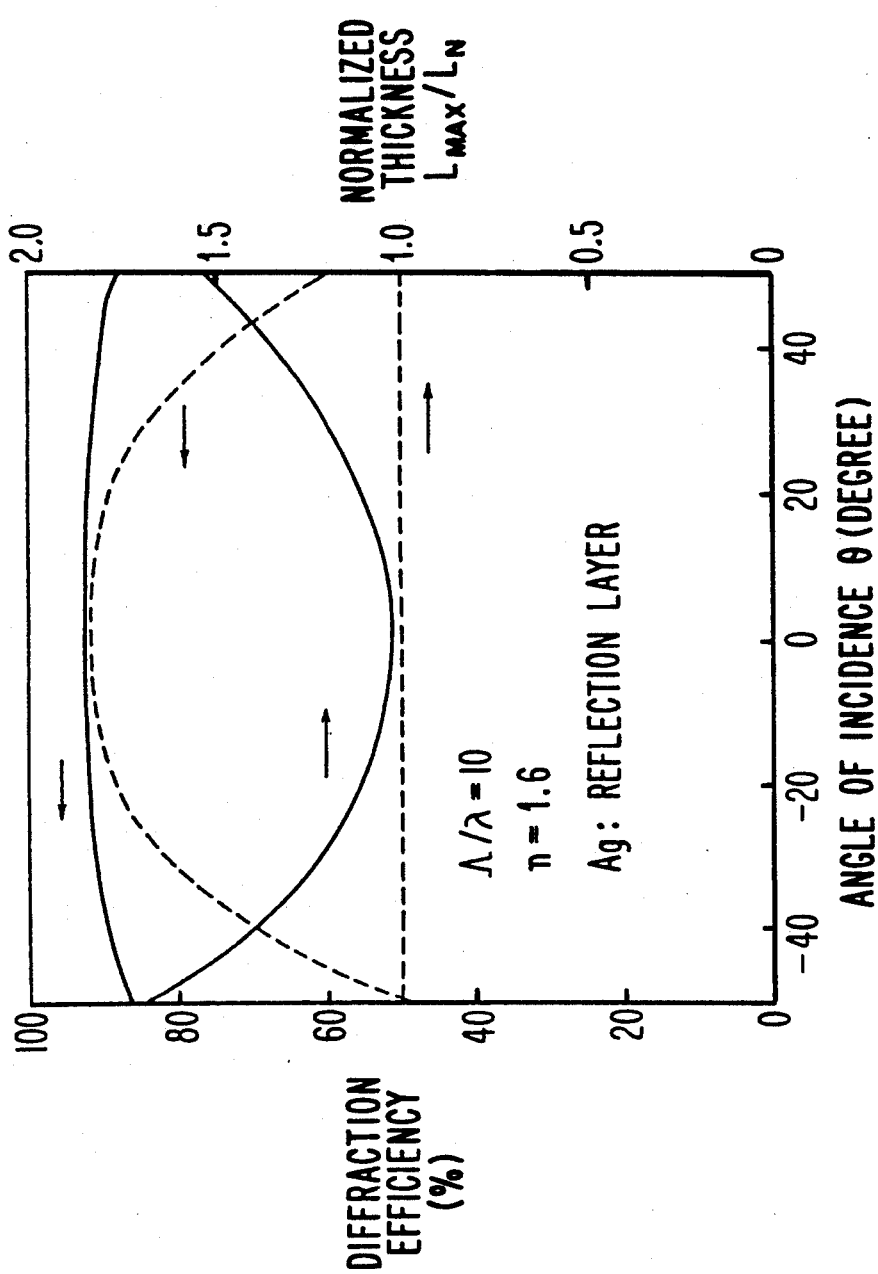
Figure 11:
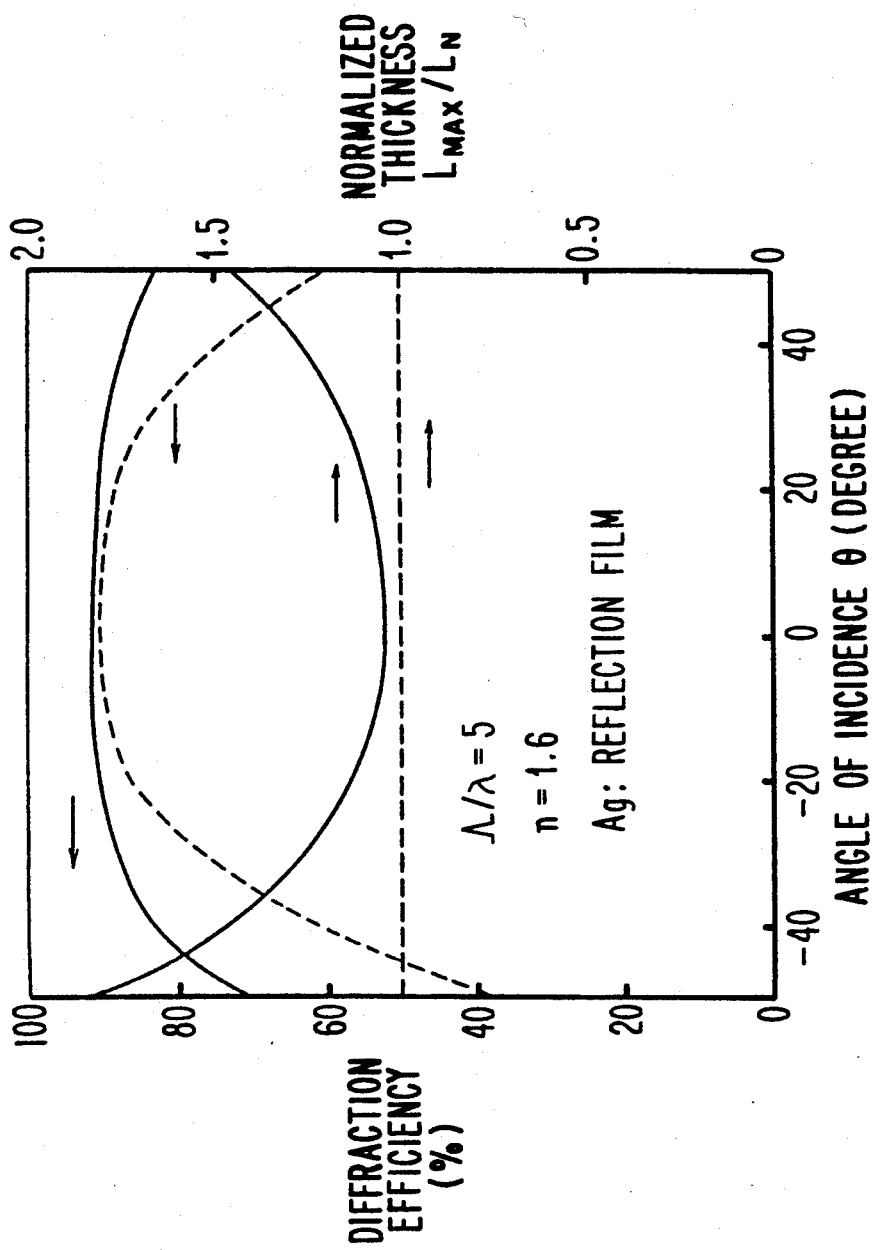

FIGS. 9, 10, and 11 show optimum maximum thickness (values in the region of the lens portion 7 which is the vicinity of $x=0$ and where $y\leq0$) of the elliptical groove when $\Lambda/\lambda=20$, 10, and 5, respectively; and a value of a first-order diffraction efficiency. A dotted line is a curve showing a relationship between the maximum thickness of the groove and the first-order diffraction efficiency, when the maximum thickness of the groove is constant ($L_{max} = LN = \lambda/2n$). In particular, as the absolute value of the angle of incidence $\theta$ becomes higher, the optimum maximum thickness of the elliptical groove is increased and the diffraction efficiency can be substantially improved.

Figure 12:
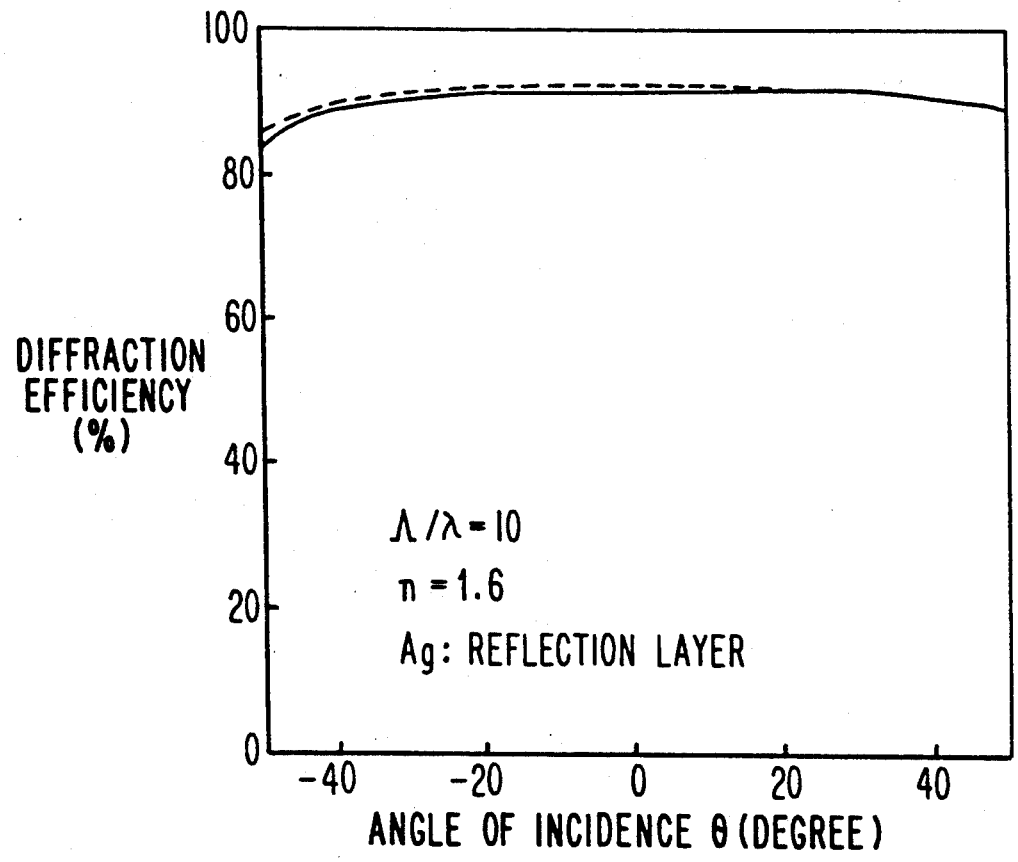
FIG. 12 is the calculated first-order diffraction efficiency curves of the second example of the diffractive optical lens of the present invention as a function of an angle of incidence $\theta$ when a film thickness $L_{max}=/2n\cdot \cos\theta$.

As shown in FIGS. 9 to 11, the optimum maximum thickness of the elliptical groove is set in accordance with the period of the elliptical groove. This optimum maximum thickness can be nearly approximated to $L_{max} = LN/\cos\theta = \lambda/2n\sqrt{\cos\theta}$, when the diffractive optical lens is actually used. FIG. 12 is a graph showing the relationship between the first-order diffraction efficiency (a value in the region of the lens portion 7 which is the vicinity of $x=0$ and where $y \leq 0$) and the angle of incidence $\theta$, when $\Lambda/\lambda = 10$. A solid line shows the diffraction efficiency when the maximum thickness of the groove is $L_{max} = LN/\cos\theta$, and a dotted line shows the diffraction efficiency when the maximum thickness shown in FIG. 10 of the elliptical groove is optimized. Both lines nearly coincide. According to the above setting, the optimum maximum thickness of the elliptical groove can be easily achieved in design and production. In view of an error caused during the production, the maximum thickness of the elliptical groove in the major axis direction or the depth of the groove (L long) should be in the range of $0.8\ \lambda/(2n\cdot\cos\theta) \leq L\ long \leq 1.2\ \lambda/(2n\cdot\cos\theta)$, and the maximum thickness of the elliptical groove in the minor axis direction and the depth of the groove (L short) should be in the range of $0.8\ \lambda/(2n) \leq L\ short \leq 1.2\ \lambda/(2n)$.

EXAMPLE 3

Figure 13:
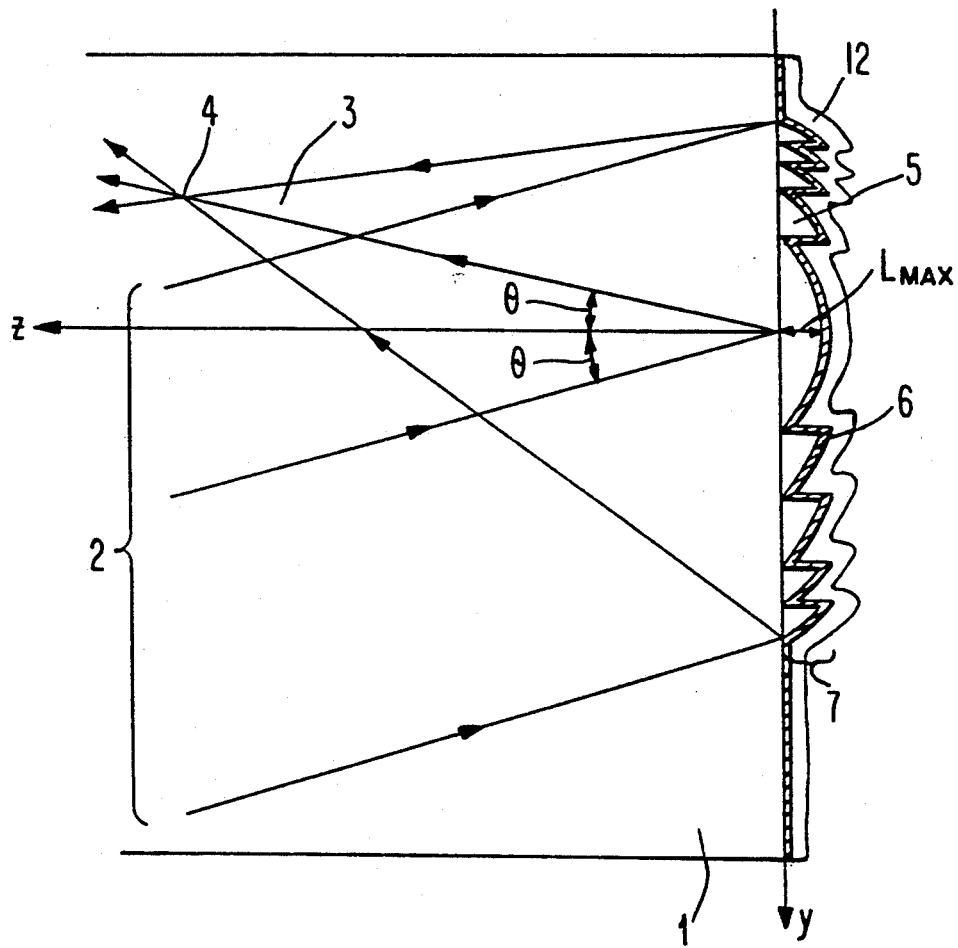
FIG. 13 is a cross-sectional view showing a third example of a diffractive optical lens of the present invention.

FIG. 13 is a cross-sectional view showing a fundamental construction of a third example of a diffractive optical lens of the present invention when incident light is focused. The diffractive optical lens of this example is a reflection type. A protective layer 12 with a thickness of 1,000 Å to several μm is deposited on the reflection layer 6. This protective layer 12 is formed from a layer made of metal such as Al, Cu, and Cr, a synthetic resin such as a UV-setting resin and lacquer paint, a multi-layer film of a dielectric substance, SiO, SiO₂, MgF₂, SiC, graphite, diamond, and the like. The other construction is the same as that of the diffractive optical lens in Example 1. The diffractive optical lens of this example comprises the protective layer 12, so that even though the surface of the protective layer 12 is scarred, the reflection layer 6 and the grating zone 5 are hardly influenced. Moreover, because of this protective layer 12, when metal is used for the reflection layer 6, the reflection layer 6 made of metal is not likely to be oxidized and the diffractive optical lens with excellent environment-resistance can be obtained. In particular, when Ag which has the most excellent reflection efficiency with respect to the incident light of He-Ne laser beam with a wavelength of 0.6328 μm is used, although Ag itself is likely to be oxidized compared with other metals, the protective layer prevents the oxidization thereof. Moreover, when the reflection layer made of Ag is used, there is a problem in that the adhesive strength between the reflection layer 6 and the lens portion 7 is low and the reflection layer 6 is likely to be peeled off from the lens portion 7. When Al is used for the protective layer 12, the adhesive strength is strengthened thus maintaining the high reflectance.

It is not necessary that the protective layer 12 is a single-layer, and a double-layer may be used.

EXAMPLE 4

Figure 14B:
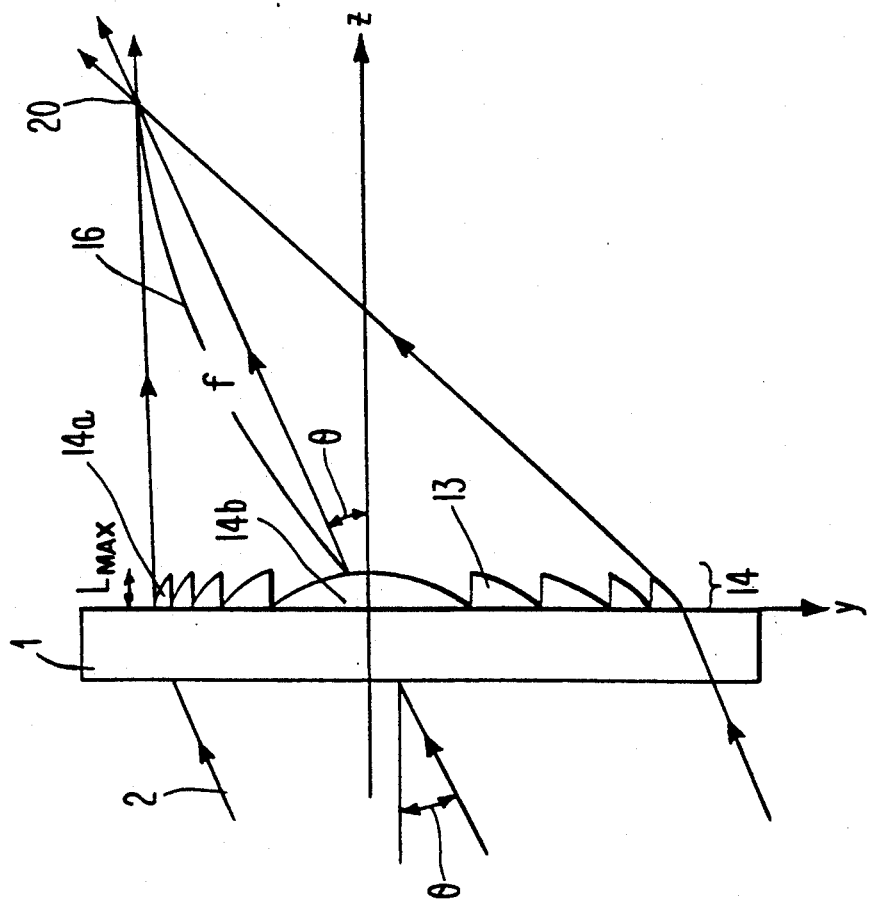
FIG. 14b is a cross-sectional view thereof.
Figure 14A:
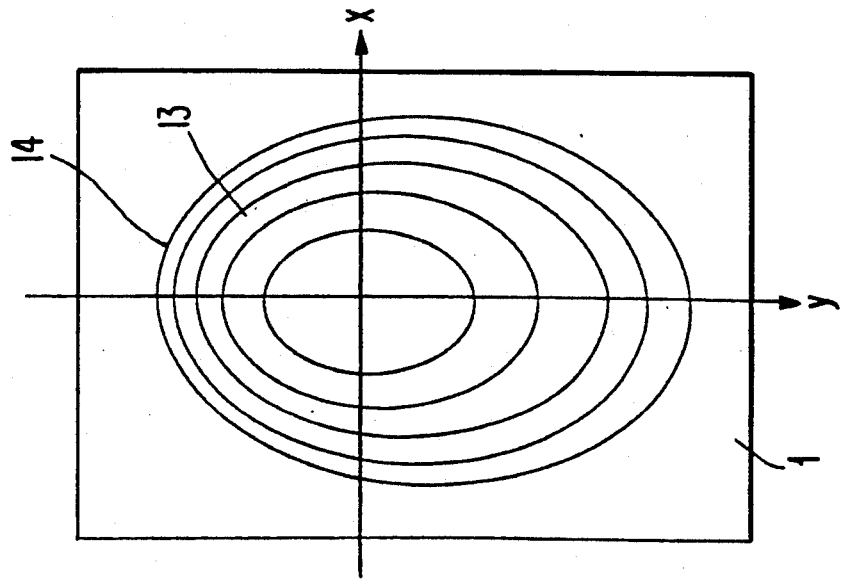
FIG. 14a is a plan view showing a fourth example of a diffractive optical lens of the present invention.

FIG. 14a is a plan view showing the fundamental construction of a fourth example of the present invention, and FIG. 14b is a cross-sectional view showing the fundamental construction of the fourth example of the present invention when incident light is focussed. The diffractive optical lens of this example is a transmission type. In this example, a lens portion 14 is provided on a flat transparent substrate 1. The lens portion 14, in the same way as in Example 1, has a grating zone 14a at the outer peripheral portion thereof where a grating pattern which is a collection of a plurality of ellipses similar to each other and a core section 14b surrounded by the grating zone 14a at the center thereof. In order to describe the lens portion 14 in more detail, the surface of the substrate 1 on which the lens portion 14 is provided is made an x-y plane, and a z-axis is orthogonal to the x-y plane. Each elliptical groove forming the grating pattern of the grating zone 14a has a major axis in a y-axis direction and a minor axis in an x-axis direction. Each elliptical groove is not concentric, and the center of each elliptical groove is successively shifted in one direction of the major axis (+y direction).

Light is incident upon the lens portion 7 with a tilt angle $\theta$ in the y-z plane with respect to the z-axis. The incident light is diffracted by the lens portion 14 and passes therethrough. The light passed through the lens portion 14 becomes transmitted light 16 having an optical axis with an angle $\theta$ with respect to the z-axis in the -y-direction in the y-z plane and is focused at a focal point 20.

As described above, in the transmission diffractive optical lens, a configuration of a groove in the grating zone 14a is made in an elliptical shape, whereby an astigmatism caused when the incident light 2 is obliquely incident is minimized, a coma is minimized by gradually shifting the center of the elliptical groove in the direction against which the incident light 2 is tilted, and the incident light 2 is satisfactorily focused.

In order to examine the diffractive optical lens of this example in more detail, assuming that a focal length is f and a wavelength is $\lambda$, a phase shift function $\Phi_1$ of the lens is given by $$\Phi_1(x, y) = k[\sqrt{x^2 + (f\cdot\sin\theta + y)^2 + f^2\cdot\cos^2\theta} - f - y\cdot\sin\theta] - 2m\pi.$$

where $k = 2\pi/\lambda$, m is an integer satisfying $0 \leq \Phi \leq 2\pi$. Assuming that the maximum thickness of the groove of the lens portion 14 or the maximum depth of the groove is $L_{max}$, a distribution L of the maximum thickness of the groove of the lens portion 14 is given by $$L(x, y) = L_{max}(1 - \Phi/2\pi).$$

Therefore, when the angle of incidence $\theta$ of the incident light is large, the ratio ($1/\cos\theta$) of the major axis to the minor axis of the elliptical groove at the grating zone 14a is increased and the shift of the center of the elliptical groove is enlarged. These results are confirmed by a theoretical analysis using ray trace.

When the cross section of the grating zone 14a is in a sawtooth shape, the diffraction efficiency is increased. When the maximum thickness ($L_{max}$) of the groove of the grating zone 14a with respect to an index of refraction (n) of the lens portion 14 is given by 0.6 $\lambda/(n-1) \leq L_{max} \leq 1.5 \lambda/(n-1)$, and a high diffraction efficiency can be obtained.

As described above, the diffractive optical lens of the present example is a transmission type. The configuration of the pattern of the grating zone 14a thereof is the same as that of the reflection diffractive optical lens in Examples 1 to 3. However, in this example, there is no reflection layer, so that the grating zone 14a is thicker than that of the reflection diffractive optical lens. A method for producing this transmission diffractive optical lens is approximately the same as that of the reflection diffractive optical lens.

It is understood that various other modifications will be apparent to and can be readily made by those skilled in the art without departing from the scope and spirit of this invention. Accordingly, it is not intended that the scope of the claims appended hereto be limited to description as set forth herein, but rather that the claims be construed as encompassing all the features of patentable novelty that reside i the present invention, including all features that would be treated as equivalents thereof by those skilled in the art to which this invention pertains.

What is claimed is:

1. A diffractive optical lens comprising:
   a transparent substrate upon which light is incident; and
   a lens portion including a grating zone at an outer peripheral portion thereof, the grating zone having a plurality of elliptical grooves which are similar in shape to each other with their major axes being aligned, the lens portion being provided on the surface of the transparent substrate so as to allow the light incident upon the transparent substrate to be incident upon the lens portion;
   wherein the centers of the elliptical grooves are shifted in one direction of the major axis with respect to the elliptical groove positioned in an inner peripheral portion.

2. A diffractive optical lens according to claim 1, wherein the incident light is incident upon the transparent substrate at an angle $\theta$ with respect to a normal to the major axis direction in which the centers of the elliptical grooves are shifted.

3. A diffractive optical lens according to claim 2, wherein a ratio of a length of each elliptical groove in the major axis direction to a length of each elliptical groove in the minor axis direction (a length in the major axis direction/a length in the minor axis direction) is $1/\cos\theta$.

4. A diffractive optical lens according to claim 1, wherein either a maximum depth of each elliptical groove or a maximum thickness of the elliptical groove is varied in accordance with at least either the grating period of each elliptical groove or a peripheral direction of each elliptical groove.

5. A diffractive optical lens according to claim 4, wherein either the maximum depth of each elliptical groove or the maximum thickness of the elliptical groove is locally maximized in the major axis direction of each elliptical groove and is locally minimized in the minor axis direction of each elliptical groove.

6. A diffractive optical lens according to claim 5, wherein a local maximum value in the direction in which the center of the elliptical groove positioned at the outer peripheral portion is shifted is larger than the local maximum value in the opposite direction.

7. A diffractive optical lens according to claim 5, wherein a cross section of the grating zone is in a sawtooth shape, either the maximum depth of each elliptical groove in the major axis direction or the maximum thickness of the elliptical groove in the major axis direction is given as L long $= \lambda/(2 n \cos\theta)$ with respect to an index of refraction of the grating zone (n), a wavelength of the incident light ($\lambda$), and an angle of incidence ($\theta$), and either the maximum depth of each elliptical groove in the minor axis direction or the maximum thickness of the elliptical groove in the minor axis direction is given as L short $= \lambda/(2n)$.

8. A diffractive optical lens according to claim 1, wherein the lens portion is covered with a reflection layer.

9. A diffractive optical lens according to claim 8, wherein the thickness of the reflection layer is larger than the maximum thickness of the grating zone.

10. A diffractive optical lens according to claim 8, wherein the reflection layer is covered with a protective layer.

* * * * *